United States Patent

Smeulers

[15] 3,706,847

[45] Dec. 19, 1972

[54] SLICING SYNCHRONIZING PULSE SEPARATOR CIRCUIT

[72] Inventor: Wouter Smeulers, Emmasingel, Eindhoven, Netherlands

[73] Assignee: U.S. Philips Corporation, New York, N.Y.

[22] Filed: Dec. 17, 1970

[21] Appl. No.: 99,055

[30] Foreign Application Priority Data

Jan. 19, 1970 Netherlands ........................7000743

[52] U.S. Cl...................................................178/7.35

[51] Int. Cl................................................H04n 5/08

[58] Field of Search..178/6 TT, 7.3 S, 7.5 S, DIG. 12

[56] References Cited

UNITED STATES PATENTS

| | | | |
|---|---|---|---|
| 3,398,298 | 8/1968 | Baun | 178/7.3 S |
| 2,890,352 | 6/1959 | Goodrich | 178/7.3 S |
| 2,868,873 | 1/1959 | Splitt | 178/7.3 S |

*Primary Examiner*—Robert L. Griffin
*Assistant Examiner*—Donald E. Stout
*Attorney*—Frank R. Trifari

[57] ABSTRACT

A synchronizing pulse separator circuit with which slicing of the separated synchronizing pulse relative to a fixed level between the peak level and black level is obtained by combining the reference level for the separator, preferably by averaging, from an optionally corrected level obtained by both peak level detection and by porch level detection.

9 Claims, 4 Drawing Figures

INVENTOR.
WOUTER SMEULERS

BY
AGENT

INVENTOR.
WOUTER SMEULERS
BY Frank R. Trifari
AGENT

INVENTOR.
WOUTER SMEULERS

BY

AGENT

SLICING SYNCHRONIZING PULSE SEPARATOR CIRCUIT

The invention relates to a slicing synchronizing pulse separator circuit particularly for separating from a television signal a portion of a synchronizing pulse located between the peak and porch levels comprising a peak level detection circuit coupled to a video signal input of the circuit and detecting the peaks of the synchronizing pulses and a slicing amplitude selection circuit coupled to the peak level detection circuit.

A circuit of the kind described above is known from United Kingdom Pat. Specification Nos. 1,143,241 and 755,108 in which the peak level detection circuit is constituted by the grid-cathode circuit of a tube whose anode circuit is coupled to an input of a subsequent tube arranged as a slicer. Such a slicing circuit has the advantage that not only the video signal is separated from the synchronizing pulse but also the interference-sensitive synchronizing pulse peaks. As a result the synchronizing pulse separated with the aid of such a circuit is largely independent of interference signals. The amplitude of the video signal from which the synchronizing pulses are separated must, however, be always fairly large to ensure an interference-free operation of the circuit.

An object of the present invention is to provide a circuit which separates synchronizing pulses which have a large amount of interference and have small video signal amplitudes.

To this end a slicing synchronizing pulse separator circuit of the kind described in the preamble according to the invention is characterized in that the synchronizing pulse separator circuit includes a porch level detection circuit coupled to the video signal input and a combination circuit coupled to an output of the peak level detection circuit and to an output of the porch level detection circuit, at least an output of said combination circuit being coupled to a reference input of the amplitude selection circuit and a signal input of the amplitude selection circuit being coupled to the video signal input of the circuit.

The limiting levels of the amplitude selection circuit are adapted to the amplitude of the synchronizing pulse in the video signal with the aid of a bias voltage obtained by means of the combination circuit and applied to the reference input of the slicing amplitude selection circuit. As a result the mutual location of the synchronizing pulse and the limiting levels remains as favorable as possible for a satisfactory and interference-insensitive synchronizing pulse separation and also in case of large variations of this amplitude or of the amplitude ratio between the synchronizing pulse and the rest of the video signal.

In order that the invention may be readily carried into effect some embodiments thereof will now be described in detail by way of example with reference to the accompanying diagrammatic drawings in which.

Figures 1, 2:
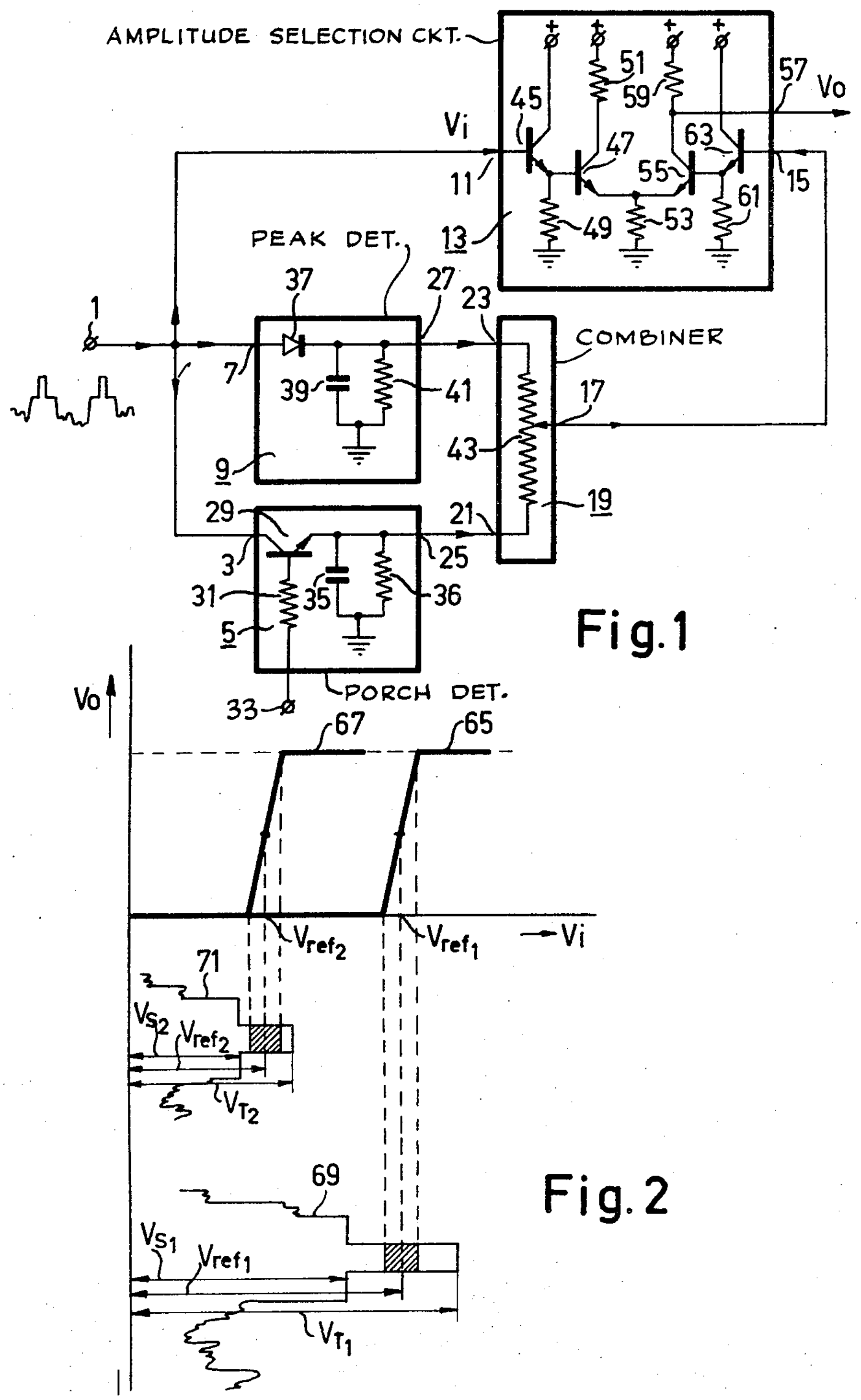
FIG. 1 illustrates by way of a non-detailed circuit diagram an embodiment of a synchronizing pulse separator according to the invention.
FIG. 2 illustrates by way of several curves the operation of the synchronizing pulse separator according to the invention.

In FIG. 1 a video signal input 1 is connected to an input 3 of a porch level detection circuit 5, to an input 7 of a peak level detection circuit 9 and to a signal input 11 of a slicing amplitude selection circuit 13. A video signal which may be rendered free from interference in, for example, known manner and which may contain a D.C.-component or not is applied to the video signal input 1.

A reference input 15 of the amplitude selection circuit 13 is connected to an output 17 of a combination circuit 19. Inputs 21 and 23 of the combination circuit 19 are connected to outputs 25 and 27 respectively, of the porch level detection circuit 5 and the peak level detection circuit 9, respectively.

The input 3 of the porch level detection circuit 5 is connected to the collector of an npn transistor 29. The base of transistor 29 is connected through a resistor 31 to a selection signal input 33 of the porch level detection circuit 5. The emitter of transistor 29 is connected to one end of a first detection capacitor 35, one end of a first detection resistor 36 and to the output 25 of the porch level detection circuit 5. The other ends of the first detection capacitor 35 and the first detection resistor 36 are connected to ground.

When a selection signal is applied to the selection input signal 33 of the porch level detection circuit 5 which signal causes the transistor 29 to conduct only during the occurrence of, for example, the back porch, the voltage on capacitor 35 becomes substantially equal to the porch level in the video signal applied to the input 3 of the porch level detection circuit 5. This detected porch level voltage is applied through the output 25 of the porch level detection circuit 5 to the input 21 of the combination circuit 19.

The input 7 of the peak level detection circuit 9 is connected to the anode of a diode 37 whose cathode is connected to one end of a second detection capacitor 39, one end of a second detection resistor 41 and the output 27 of the peak level detection circuit 9. The other ends of capacitor 39 and resistor 41 are connected to earth.

When a video signal having positive synchronizing pulse peaks is applied to the input 7 of the peak level detection circuit 9 the capacitor 39 is charged to substantially the peak voltage of the synchronizing pulses in the video signal. This voltage is applied through the output 27 of the peak level detection circuit 9 to the input 23 of the combination circuit 19.

The combination circuit 19 includes a resistor 43 arranged between the inputs 21 and 23 a tap of which resistor is coupled to the output 17 of the combination circuit 19.

A voltage which has a value between the peak value and the porch value of the voltage at the video signal input 1 of the circuit is produced at the output 17 of the combination circuit 19. This value remains at relatively fixed distance between the peak value and the porch value for each video signal amplitude at the input 1 of the circuit.

The voltage of the output 17 is applied to the reference input 15 of the amplitude selection circuit 13.

The signal input 11 of the amplitude selection circuit 13 is connected to the base of an npn transistor 45. The transistor 45 is arranged as an emitter follower. Its collector is connected to a positive supply voltage and its emitter is connected to the base of a transistor 47 and to earth through a resistor 49. The collector of transistor 47 is connected to a positive supply voltage through a resistor 51. The emitter is connected to earth through a resistor 53 and furthermore to the emitter of an npn transistor 55. The collector of transistor 55 is connected to an output 57 of the circuit and to a positive supply voltage through a resistor 59. The base of transistor 55 is connected to earth through a resistor 61 and is furthermore connected to an npn transistor 63 arranged as an emitter follower whose collector is connected to a positive supply voltage and whose base is connected to the reference input 15 of the amplitude selection circuit 13.

The operation of the synchronizing pulse separator circuit will now be described with reference to FIG. 2.

The upper portion of FIG. 2 shows two characteristic curves 65 and 67 in slightly ideal forms which denote the voltage $V_o$ at the output 57 as a function of the voltage $V_i$ at the input 11 at two different values $V_{ref1}$ and $V_{ref2}$' respectively, of the voltage at the reference input 15. For the sake of clarity the two characteristic curves 65 and 67 are shown at the same height and not to scale.

The lower portion of FIG. 2 shows two video signals 69 and 71 as a function of time of large and small amplitudes, respectively, as may occur at the signal input 11 of the amplitude selection circuit 13, the amplitude axis $V_i$ of the upper and lower parts of the Figure being common.

When the signal 69 of large amplitude occurs at the signal input 11 of the amplitude selection circuit 13 a direct voltage $V_T$ is simultaneously produced at the output 27 of the peak level detection circuit 9 and a direct voltage $V_{B_1}$ is produced at the output 25 of the porch level detection circuit 5. A direct voltage $V_{ref_1}$ having a value which is dependent on the adjustment of resistor 43 which is located between the voltages $V_{T_1}$ and $V_{B_1}$, preferably the mean value of these two voltages, is then produced at the output 17 of the combination circuit 19.

The direct voltage $V_{ref_1}$ is applied to the reference input 15 of the amplitude selection circuit 13. The characteristic curve 65 of the amplitude selection circuit 13 is associated with this voltage $V_{ref_1}$. The shaded portion of the synchronizing pulse of this video signal is then passed on from the video signal 69.

When a video signal 71 of small amplitude occurs at the signal input 11 of the amplitude selection circuit 13 a direct voltage having a value of $V_{ref_2}$ which is the mean value of the then occurring peak level $V_{T_2}$ and porch level $V_{B_2}$ is then likewise produced at the reference signal input 15. The amplitude selection circuit then has the characteristic curve 67. The shaded portion of the synchronizing pulse is again selected from this video signal 71 and is passed on to the output 57 of the amplitude selection circuit 13.

Furthermore it will be evident that due to the proportionally varying bias voltage for each signal amplitude of the video signal a portion of the synchronizing signal about a mean value of the peak and porch levels is always separated so that a synchronizing signal, which has interference on it, is obtained free from the interference at the output 57 of the amplitude selection circuit 13.

Although in the foregoing a so-called long-tailed pair arrangement is taken as an amplitude selection circuit 13, this is not essential for the present invention; any suitable slicer may be used.

As a result of the threshold voltage of the non-ideal diode 37 the peak level detection circuit 9 produces a shift in the level which may render the operation of the circuit less effective for very small video signals. An improvement may be obtained by using a keyed peak level detection circuit 9 active in the video signal at the instant of occurrence of the peak synchronizing level, which circuit corresponds to the circuit used for the porch level detection circuit 5. Hence, generally by using detectors having the same level shift, optionally with the addition of a level correction circuit, the circuit is more effective for weak signals.

Furthermore it will be evident that a circuit arrangement according to the invention may be rendered suitable for video signals obtained from both a positively modulated television signal and for video signals obtained from a negatively modulated television signal.

Figure 3:
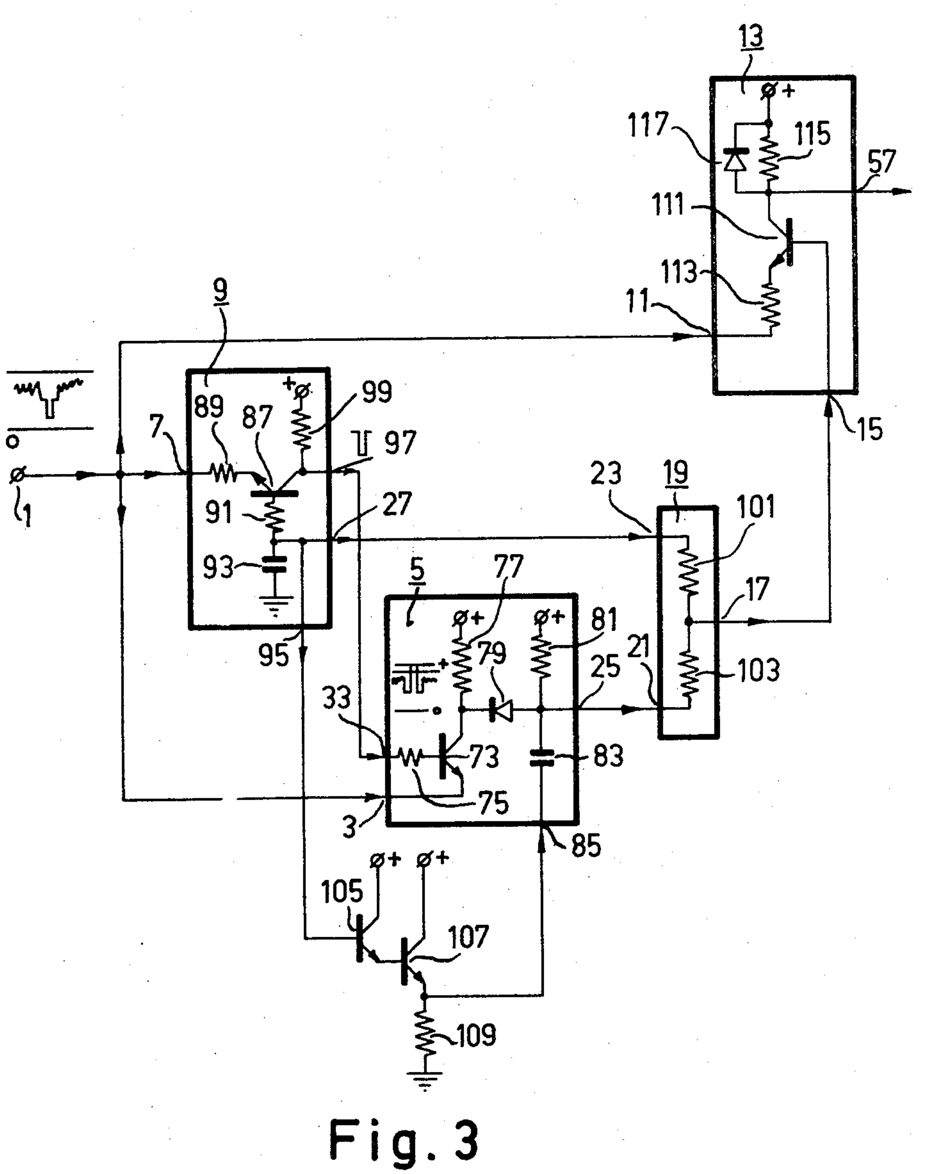
FIG. 3 shows by way of a non-detailed circuit diagram a further embodiment of a synchronizing pulse separator according to the invention.

In FIG. 3 corresponding components have the same reference numerals as those in FIG. 1 so that for the description of the operation thereof reference is made to the circuit of FIG. 1.

The detection circuits 5 and 9 and the amplitude selection circuit 13 are formed differently from those of FIG. 1 while furthermore a few couplings between the two detection circuits are provided to render the circuit more insensitive to interference.

The porch level detection circuit 5 includes an npn transistor 73 whose emitter is connected to the input 3. The base of transistor 73 is connected through a resistor 75 to the selection signal input 33 while the collector is connected through a resistor 77 to a positive supply voltage and to the cathode of a diode 79. The anode of diode 79 is connected to the output 25, to a positive supply voltage through a first detection resistor 81 and to an electrode of a first detection capacitor 83. The other electrode of detection capacitor 83 is connected to an input 85 of the porch level detection circuit 5.

The peak level detection circuit 9 includes a resistor 89 which is connected at one end to the input 7 and at the other end to the emitter of an npn transistor 87. The base of transistor 87 is connected through a resistor 91 to a second detection capacitor 93 whose other end is connected to earth.

The connection between resistor 91 and the second detection capacitor 93 is coupled to an output 95 and to the output 27 of the peak level detection circuit 9. The collector of transistor 87 is coupled to an output 97 of the peak level detection circuit 9 and to a positive supply voltage through a resistor 99.

The emitter-base junction of transistor 87 serves as a detection element and charges the capacitor 93 every time to substantially the peak level of the synchronizing pulse of a video signal applied to the input 7. A series arrangement of two resistors 101 and 103 included between the inputs 21 and 23 of the combination circuit 19 serves as a second detection resistor whose junction is connected to the output 17 of the combination circuit. Since a direct voltage originating from the porch level detection circuit 5 is present at the input 21 of the combination circuit 19 and the value of said direct voltage thus substantially corresponds to the porch level in the video signal which is applied to the input 7 of the peak level detection circuit 9, the exchange of charge of the detection capacitor 93 beyond the periods of time during which the synchronizing pulses occur in the video signal depends on the difference between the black level applied to the input 21 of the combination circuit 19 and the peak level which is assumed every time by the second detection capacitor 93. As a result it is achieved that the penetration depth of the peak level detection circuit 9 is always adapted to the amplitude of the video signal. Penetration depth is understood to mean the level difference between the synchronizing pulse peak level in the video signal at the input 7 and the level in the video signal at the input 7 of the peak level detection circuit 9 corresponding to the obtained direct voltage level at the output 27 of the peak level detection circuit 9. This level difference is dependent on the current which is derived from the second detection capacitor 93 during the occurrence of the synchronizing pulse peaks through the base-emitter junction of the transistor 87 and hence on the exchange of charge of said capacitor beyond this period. As a result it is achieved that the relative location of the reference level at the output 17 of the combination circuit 19 relative to the synchronizing pulse peak level and the black level in the video signal remains more constant than for a peak level detection circuit having a detection resistor at a fixed voltage.

The transistor 87 only conducts during the occurrence of the negatively directed synchronizing pulse peaks of the video signal at the input 7. As a result amplified negatively directed voltage pulses occur at the collector of transistor 87, which pulses are applied through the output 97 of the peak level detection circuit 9 to the selection signal input 33 of the porch level detection circuit 5. These negative going pulses reach the base of transistor 73 and cut it off. The video signal which is applied through the input 3 of the porch level detection circuit to the emitter of transistor 73 can exert influence on the current flowing through this transistor 73 only beyond the periods of the synchronizing pulse peaks. Therefore a video signal in which the lowest values correspond to the porch level in the video signal occurs at the collector of this transistor 73. The series arrangement of the resistors 99 and 75 which serves as a base resistor for transistor 73 is proportioned in such a manner that transistor 73 is substantially saturated beyond the periods of the synchronizing pulse peaks so that then the collector potential is substantially equal to the emitter potential.

The minimum signal values of the collector of transistor 73 which correspond to the porches in the video signal are transferred through diode 79 to the first detection capacitor 83 which partially exchanges its charge beyond the porch periods through the first detection resistor 81 to a positive voltage.

The time constant of the first detection resistor 81 together with the first detection capacitor 83 must be long so as to maintain substantially the porch level also during the occurrence of field synchronizing pulses in the video signal at the output 25. Rapid changes in amplitude which may result from, for example, an interfering low-frequency signal or hum could then not be followed by the voltage at the output 25 so that the level at this output would not be a faithful reproduction of the porch level and hence the reference level of the amplitude selection circuit would not be correct either. To prevent this these rapid changes in amplitude are applied through the input 85 so that the junction of the first detection resistor 81 and the first detection capacitor 83 follows these changes in amplitude without the necessity of correcting the charge of capacitor 83.

The rapid changes in amplitude are obtained from the detected synchronizing pulse peak level which occurs at the output 95 of the peak level detection circuit 9. The time constant of the second detection capacitor 93 and the second detection resistor 101, 103 is sufficiently short to follow rapid variations. In fact, this constant must not be too long to follow variations in the level of the video signal sufficiently rapidly and to prevent a single interference peak which would occur on a synchronizing peak from exerting influence on the reference voltage to be obtained for too long a period. The detected synchronizing pulse peak level voltage is applied from the output 95 through an npn transistor 105 arranged as a first emitter follower to the base of an npn transistor 107 arranged as a second emitter follower. To this end the base of transistor 105 is connected to the output 95, the collector is connected to a positive supply voltage and the emitter is connected to the base of transistor 107. The collector of transistor 107 is connected to a positive supply voltage and the emitter is connected to earth through a resistor 109.

The slicing amplitude selection circuit 13 includes an npn transistor 111 whose base is connected to the reference signal input 15, the emitter is connected through a resistor 113 to the signal input 11 and the collector is connected to positive supply voltage through a parallel arrangement of a resistor 115 and a diode 117. Transistor 111 is cut off when its emitter is positive relative to the base i.e. when the video signal level at the input 11 lies above the reference signal level at the reference input 15. Only when the synchronizing pulses occur does this polarity change and transistor 111 may conduct. The ratio of the collector resistor 115 and the emitter resistor 113 is chosen to be such that a very small voltage difference between the base and the emitter saturates the transistor so that a synchronizing pulse separation is also obtained with this circuit arrangement which separates the synchronizing pulse from the video signal between two levels closely located near a reference level.

The video signal input 1 of the synchronizing pulse separator circuit is preferably controlled by a source having a low impedance, for example, an emitter follower.

It will be evident that optionally pnp transistors or tubes may alternatively be used provided that the rest of the circuit is adapted thereto.

Figure 4:
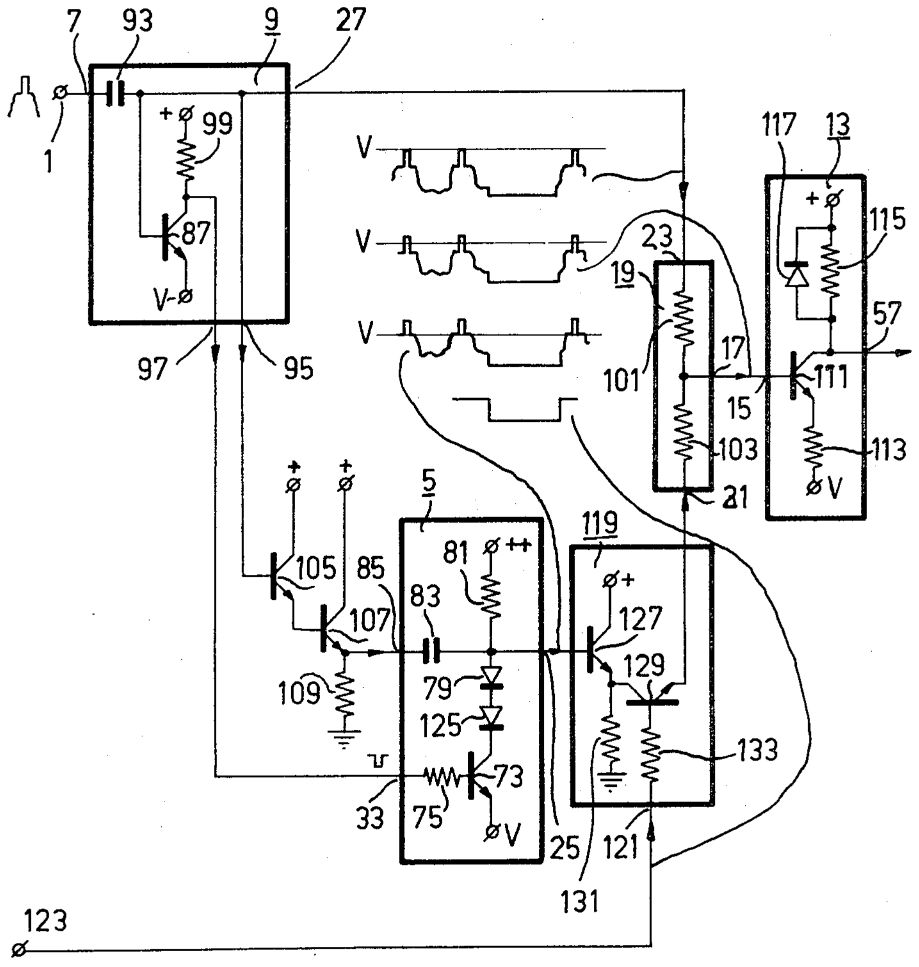
FIG. 4 illustrates by way of a non-detailed circuit diagram an embodiment mainly corresponding to the embodiment according to FIG. 3 in which the detection circuits are formed as D.C.restorers.

FIG. 4 shows an embodiment which mainly corresponds to that of FIG. 3 and in which the corresponding elements have the same reference numerals.

The porch level detection circuit 5 and the peak level detection circuit 9 are now, however, formed as D.C. restorers, while the amplitude selection circuit 13 does not have a separate video signal input anymore.

Furthermore a switching circuit 119 is included between the output 25 of the porch level detection circuit 5 and the input 21 of the combination circuit 19, which switching circuit is connected through an input 121 to an interference signal input 123 of the synchronizing pulse separator circuit-A level correction diode 125 is arranged in series with the diode 79 to the collector of transistor 73.

The emitters of transistors 73, 87 and 111 are then connected to a supply voltage V.

The collector resistor 77 of transistor 73 in the porch level detection circuit 5 has been omitted.

The second detection capacitor 93 in the peak level detection circuit 9 is connected at one end to the input 7 and at the other end to the base of transistor 87 and to the outputs 27 and 95.

The switching circuit 119 includes an npn transistor 127 arranged as an emitter follower whose base is connected to the output 25 of the porch level detection circuit 5, the collector is connected to a positive supply voltage and the emitter is connected to the collector of an npn transistor 129 serving as a switch and connected to earth through a resistor 131. The base of transistor 129 is connected through a resistor 133 to the input 121 and the emitter is connected to the input 21 of the combination circuit 19. Transistor 129 normally conducts and is only cut off when a negative going interference signal occurs at the interference signal input 123 of the circuit. The input 21 of the combination circuit 21 then becomes floating and since the combination circuit also serves as a detection resistor for the peak level detection circuit 9 the charge of the second detection capacitor 93 cannot substantially change anymore. Thus there will be no risk that the amplitude selection 13 will pass part of the video signal in the absence for some time of synchronizing pulses as a result of the video signal at the video signal input 1 of the circuit being rendered free from interference in case of a long interference pulse.

The porch level detection circuit 5 and the peak level detection circuit 9 operate, as already stated, as so-called D.C. restorers. The video signal whose porch level and whose peak level have taken up potential V, apart from level shifts adapted to each other, then appears at the outputs 25 and 27 respectively, of the restorers. These signals are applied to the combination circuit 19 and the video signal appears at the output 17 thereof, a level of said signal located between the porch and the peak level having potential V which is also present at the emitter of transistor 111 of the amplitude selection circuit 13. This signal is applied to the input 15 of the amplitude selection circuit 13 which again selects from this signal a part of the synchronizing pulse in the vicinity of the potential V. This part always maintains practically the same location relative to the peak and porch levels in the video signal.

Optionally, the switching circuit 119 may be incorporated between the input 23 of the combination circuit 19 and the output 27 of the peak level detection circuit 9. In the circuit of FIG. 3 a switching transistor operated by interference signals may be included between the emitter of transistor 105 and the base of transistor 107 for the same purpose, while the base of transistor 107 must then be connected to a fixed potential through a capacitor serving as a storage element.

Combination circuit 19 is formed in a very simple manner in the above-mentioned embodiments. It will be evident to those skilled in the art that optionally a more complicated circuit for determining a mean value between the peak and porch levels may be used, while there may optionally be a weighted average so that the reference level can be chosen to be closer to the peak or to the porch.

What is claimed is:

1. A circuit for separating the synchronizing signal from a composite video signal having luminance and synchronization components, said circuit comprising means adapted to receive said video signal for detecting the peak value of said synchronization signal; means adapted to receive said video signal for detecting the porch level of said synchronization signal, said porch level detector having a selection signal input; means coupled to said peak and porch detecting means for combining the peak and porch level signals and for producing a reference signal having a value between said signals; and a first amplitude selection means having an input means adapted for receiving said video signal, a reference input means coupled to receive said reference signal for determining the threshold thereof, and an output means for producing an output signal during the occurrence of said synchronizing signal; and second amplitude selection means coupled to receive said video signal for applying a signal to said selection signal input.

2. A circuit as claimed in claim 1 wherein said porch detector comprises a detection element, and a first detection capacitor having a first end coupled to said element and a second end coupled to said peak detector.

3. A circuit as claimed in claim 1 wherein said peak level detector comprises a second detection capacitor and a detection resistor having a first end coupled to said second detection capacitor and a second end coupled to said porch detector.

4. A circuit as claimed in claim 3 wherein said combining means comprises said detection resistor, said resistor having a tap coupled to said reference input.

5. A circuit as claimed in claim 1 wherein said peak detector and said second amplitude selector comprise a transistor having emitter, base, and collector electrodes, the base-emitter junction comprising a peak detector element; said collector being coupled to said selection signal input.

6. A circuit as claimed in claim 1 wherein said porch detector has a time constant greater than one field period of said video signal.

7. A circuit as claimed in claim 1 further comprising a switching circuit having a first input coupled to one of said detectors, an output coupled to said combining means, and a second input adapted to receive an interference signal.

8. A circuit as claimed in claim 7 wherein said first input is coupled to said porch detector.

9. A circuit as claimed in claim 1 wherein each of said detectors comprises a direct current restorer circuit and said reference signal input means comprises said input means adapted for receiving said video signal.

* * * * *